May 8, 1945.  L. SILVER ET AL  2,375,500
APPARATUS FOR HEATING GAS STREAMS
Filed Oct. 2, 1940  2 Sheets-Sheet 1

Inventors:
Leonard Silver
Michael MacCormac.
By Stebbins & Blenko,
Attys.

May 8, 1945.  L. SILVER ET AL  2,375,500
APPARATUS FOR HEATING GAS STREAMS
Filed Oct. 2, 1940   2 Sheets-Sheet 2
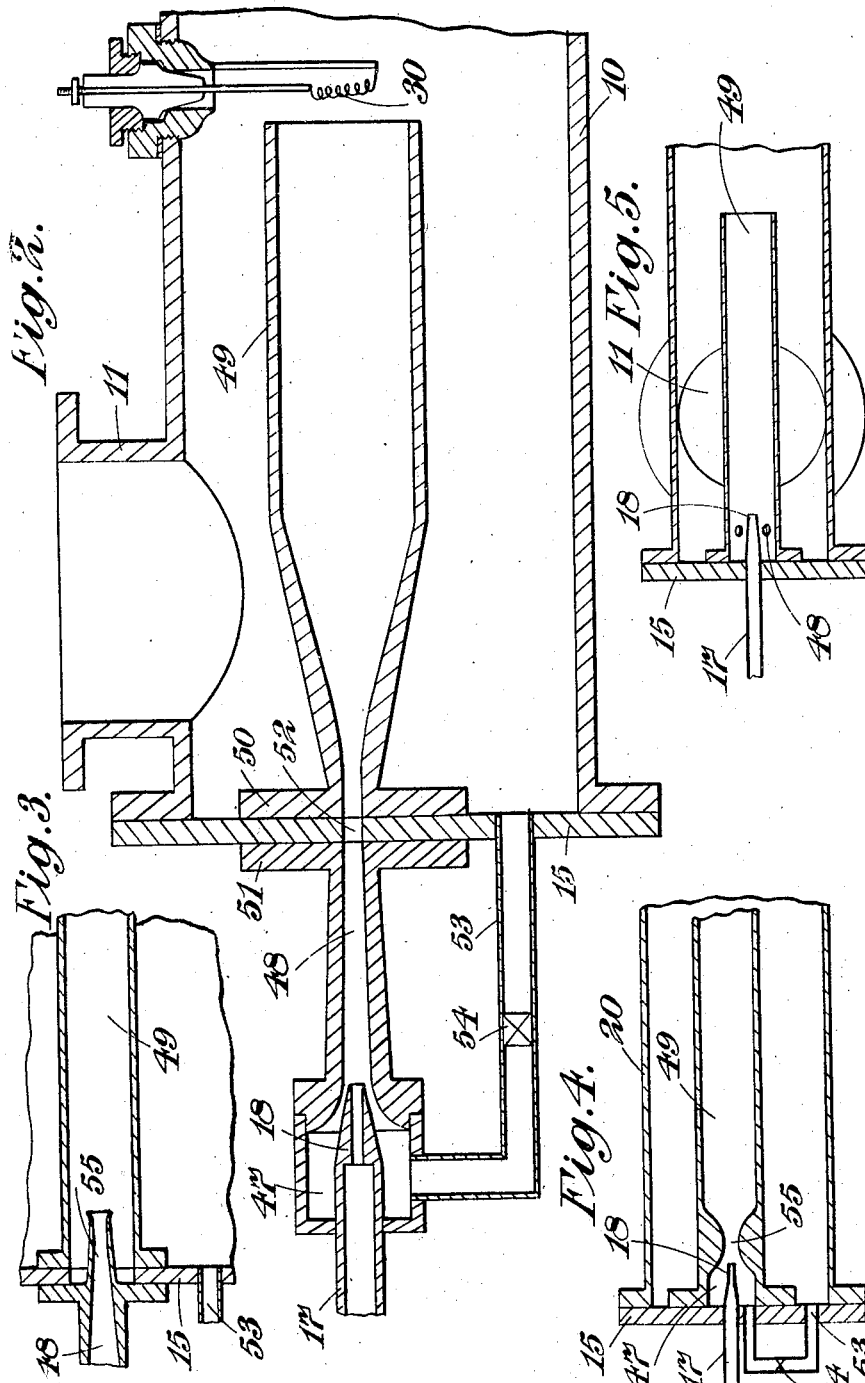

UNITED STATES PATENT OFFICE 2,375,500

APPARATUS FOR HEATING GAS STREAMS

Leonard Silver and Michael Maccormac, London, England, assignors to The Gas Light and Coke Company, Westminster, London, England, a British company Application October 2, 1940, Serial No. 359,462
In Great Britain October 9, 1939

7 Claims. (Cl. 48—190)

This invention relates to a method and apparatus for heating a stream of combustible gas. For example it may be necessary in certain catalytic reactions involving gases to preheat the gas or mixture of gases in order to initiate the catalytic reaction. Or, again, in certain instances, a reaction between gases may be self-supporting once the gases have been raised to a certain temperature, as, for example in the Fischer Tropsch process. For such purposes, the heating of the gases can be discontinued after the reaction has been initiated. The invention is also applicable to gas purifiers where the impure gas requires to be brought to a certain temperature in order to maintain the activity of the purifying material which, for example, may comprise iron oxide. In attempting to heat a stream of gas by introducing a limited supply of air locally into a gas stream and igniting it, it is found that there is a tendency for the resulting flame to be unstable and also to form soot which is deposited in the plant or on the catalyst. An object of the present invention is to overcome these disadvantages.

According to this invention a method of heating a stream of gas consists in withdrawing from the main gas stream a quantity of gas which is mixed with air for combustion, and re-introducing the mixture locally into the gas stream, either directly, or in cases where soot deposition is likely to occur through a combustion chamber, and in igniting the mixture in the combustion chamber or gas stream. The amount of gas in the mixture may range from a deficiency to a slight excess of that which would be required for complete combustion with the air. By these means it is possible to control the ratio of gas and air in the mixture to be burnt and thereby provide a stable flame and prevent the formation of soot.

The required quantity of gas may be withdrawn from the gas stream by the ejector action of a supply of compressed air which is also utilised for the combustion of the withdrawn gas.

An apparatus according to this invention thus comprises means for withdrawing from the main gas stream a quantity of gas to provide the required amount of heat for heating the gas stream, means for mixing the withdrawn gas with air for its combustion and means for reintroducing the mixture locally into the gas stream either directly or through a combustion chamber and means for igniting the mixture. As indicated above, a compressed air ejector may be arranged to effect the withdrawal of the gas from the gas stream, to mix it with the required amount of air and to reintroduce the mixture into the supply conduit.

The aforesaid compressed air ejector may comprise a nozzle which is directed into the end of a mixing passage which communicates with said combustion chamber and the inlet end of which passage also communicates with the chamber or conduit. For example, the nozzle may be located in an inlet chamber which communicates with the mixing passage and also communicates through an inlet conduit with said supply conduit.

The inlet chamber may be located either inside or outside said supply conduit.

In order that the ratio of gas and air in the mixture may be accurately controlled, the aforesaid inlet conduit may be provided with a control valve, or the passage may be provided with a calibrated restriction, or the distance between the injector nozzle and the throat may be varied.

In an apparatus embodying a combustion chamber, said chamber may be arranged to extend in an axial direction within the supply conduit and is provided with an open end so as to direct the burning mixture in the same direction as the flow of the main gas supply. For example, the combustion chamber may be cylindrical in shape and arranged co-axially with the supply conduit.

In any of the arrangements referred to above the mixing passage may be venturi in shape.

The outlet end of the mixing passage may comprise a nozzle which projects into the cylindrical combustion chamber.

In such an arrangement, the gas mixture either burns at the nozzle or at some intermediate point between it and the open end of the combustion chamber.

In a simple form of apparatus according to this invention, the combustion chamber may be located within the supply conduit and the walls thereof may be provided with a number of ports and the aforesaid air ejector nozzle may be arranged to project into the combustion chamber in the neighbourhood of said ports. Thus, a proportion of the gas stream is drawn through the ports into the combustion chamber by the ejector action of said nozzle.

The aforesaid combustion chamber and/or the mixing passage associated with it may be so shaped that the velocity of the gas-air mixture, after leaving the nozzle, decreases until it is approximately equal to the rate of propagation of a flame in the mixture.

In any of the arrangements referred to above, a flame trap such as a metal spiral, a wire gauze, a porous refractory partition, a perforated plate, or a grid may be disposed either at the inlet end of the combustion chamber or within the combustion chamber.

The air pressure requires to be greater than that of the gas supply. The amount of gas in the mixture may be slightly in excess of that which would be required for complete combustion with the air supply, but not sufficient to cause soot.

The ignition of the mixture may be effected either directly or via a pilot jet by means of a wire formed from a platinum or nickel-chromium alloy which is electrically heated and which is disposed near the outlet end of the combustion chamber. Means may be provided for moving the igniting wire out of the path of the flame when the latter has been initiated. Alternatively, the ignition means may comprise a spark gap.

The following is a description of a number of embodiments of the invention, reference being made to the accompanying drawings, in which:

Figure 2 is a similar view but of a diagrammatic character of a modified form of burner in which the injector is disposed outside said casing;

Figure 3 shows a modified form of construction shown in Figure 2, in which the injector projects into a combustion chamber located within the casing;

Figure 4 is yet a further modification in which both the injector nozzle and the combustion chamber are arranged within the casing; and Figure 5 shows an arrangement in which the ports or passages through which the gas is withdrawn from the casing, are located within the casing.

Figure 1:
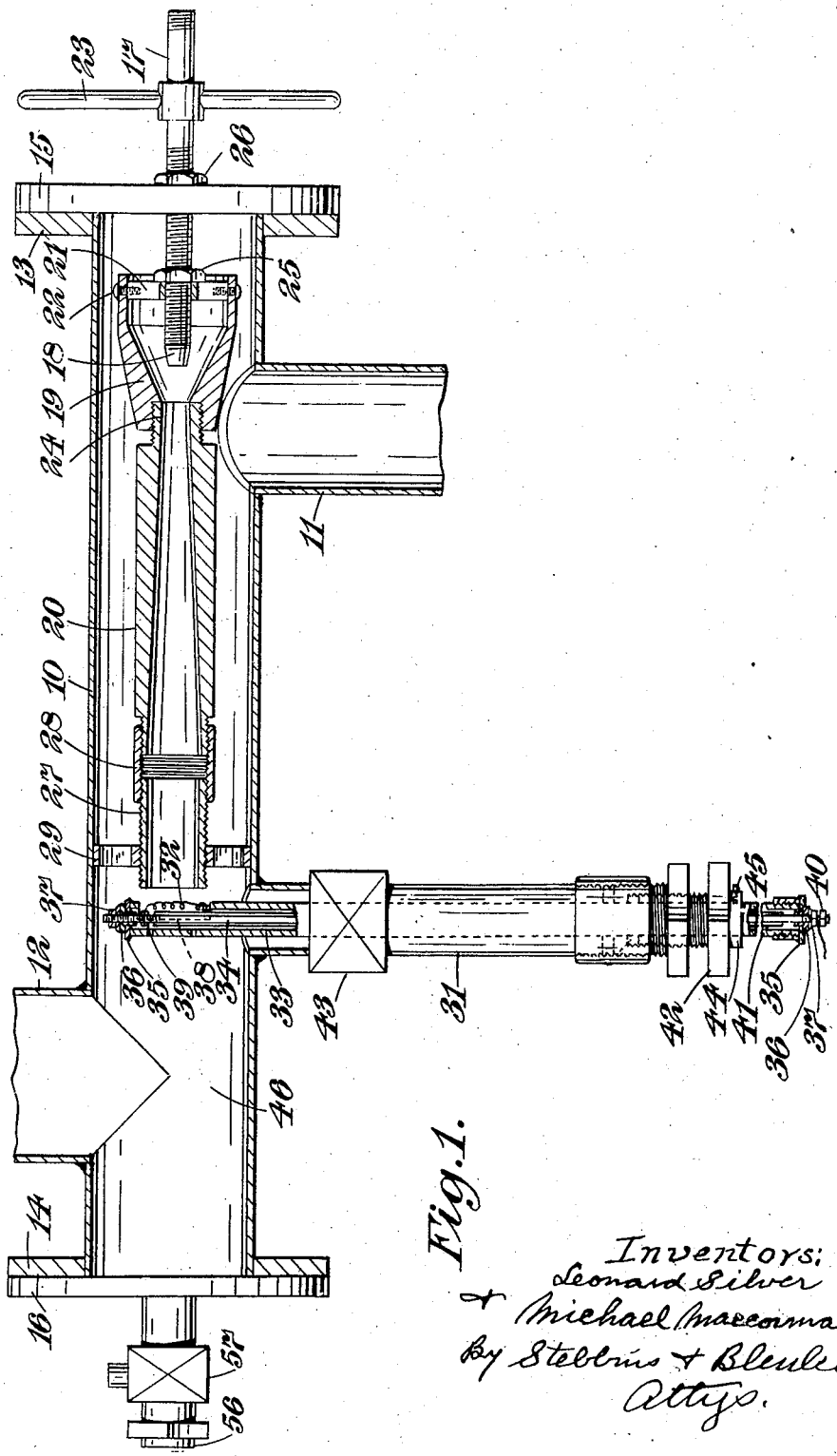
Figure 1 is a sectional elevation through one form of device for heating a gas supply in which the air injector and combustion chamber for the heating mixture are within the casing through which the main gas supply flows.

Any of these devices may be fitted with a flame trap of the type referred to.

Referring now to the construction shown in Figure 1, the gas heating device comprises a cylindrical casing 10 having a laterally-extending gas inlet passage 11 and a gas outlet passage 12 disposed near the opposite ends of the casing. The ends of the casing are flanged at 13 and 14 respectively, to which flanges are secured cover-plates 15 and 16. The cover-plate 15 near the gas inlet passage 11 is bored and threaded to receive a pipe 17 for the supply of compressed air. The end of the compressed air pipe is provided with an injector nozzle 18 which projects into one end of a Venturi passage. The Venturi passage is made in two main parts 19 and 20 which are secured together by a threaded spigot joint. The injector nozzle 18 projects into the open end of that part 19 of the Venturi passage which has the greater divergence. A suitable divergence is provided by a passage whose diameter increases from ¾ inch to 2⅛ inches over a length of 2 inches. Secured in the open end by set screws 22 is a spider member 21. The centre part of the spider is internally screw-threaded to receive the threaded end of the compressed air pipe 17 to which it is securely locked. The pipe may be rotated by an adjusting handle 23 whereby the distance between the open end of the venturi (19) and the back plate (15) can be adjusted; the required adjustment may be maintained by the lock-nut 26 which bears against the cover-plate 15. The part 20 of the venturi which is formed with the aforesaid throat 24 has a passage which diverges as it extends away from the throat from a diameter of ¾ inch to 1½ inches over a length of nine inches. The end of the Venturi part 20 remote from the throat is externally threaded and is connected with a combustion chamber 27 by a connecting piece 28 and a flame trap may be located within the connecting piece between the throat and the part 20. The combustion chamber is attached to a spider member 29 which locates the combustion chamber centrally within the cylindrical casing but leaves it free to move axially. Located opposite to the combustion chamber is an igniting device designated generally by the reference 30 which is mounted within a housing 31. The igniting device comprises an electric heating element 32 which is located in a slot 38 in a sleeve 33 and is connected at one end to the sleeve which sleeve extends through said housing. The other end of the element is connected to a steel rod 34 which is screw-threaded at its extremities. The steel is carried at its extremities by flanged insulating bushes 36 which are held in cover-plates 35 secured to the ends of the sleeve 33. The steel rod is prevented from endwise movement by nuts 37 which bear against the flanges of the insulating bushes. Terminal nuts 39 are provided on the steel rod for establishing an electrical connection with the electric element. Similarly, nuts 40 are provided for connecting the steel rod to a source of electric supply. The steel rod is encircled within the sleeve 33 by a glass tube 41 or by a tube of some other suitable insulating material. The housing 31 is provided with a gland 42 for holding the outer end of the sleeve in position, while the inner end is passed through a clearance hole in the cock 43 which is used to shut off the gas when the igniting device is withdrawn. In order that the electrical element may be correctly located opposite the combustion chamber, the sleeve 33 is provided with a locating collar 44 which may be slid along it and secured in the desired position by a grub-screw 45, the sleeve is then slid into the housing until the locating collar abuts against the gland 42.

The operation of the device is as follows:

Assuming a flow of gas is taking place through the cylindrical casing around the outside of the Venturi tube from the inlet pipe 11 to the outlet pipe 12, and that the gap between the part of the venturi 19 and the back plate 15 is closed; the burner may be lighted by switching on the electric supply to the heating element 32 after which the compressed air supplied through the pipe 17 is slowly turned on. As soon as the flame appears (as seen through the sight glass 56 and cock 57), the igniting device is withdrawn and the cock 43 closed. The burner is then rotated by means of the handle 23 so as to separate the venturi 19 from the back plate 15 until the required volume of gas is being drawn into the burner. This causes the flame to retreat into the combustion chamber 27 where it burns in a stable manner without formation of soot. If the mixture of gas and air which is being supplied to the combustion chamber still contains an excess of air some secondary combustion will continue to take place at the mouth of the burner but as a rule this also does not form any soot.

Referring now to the construction shown in Figure 2, the injector nozzle 18 of the compressed air pipe 17 is located outside the cylindrical casing 10, within an inlet chamber 47. The inlet chamber communicates through a mixing passage 48 with a combustion chamber 49 located within the casing 10. The mixing passage is formed in two parts having flanges 50 and 51, which are secured on either side of the cover-plate 15, which cover-plate is provided with an orifice 52 which forms a part of the mixing passage. The mixing passage diverges on either side of said orifice and may be separated from the combustion chamber by any suitable type of flame trap. Gas is led from the casing 10 into the inlet chamber through an inlet conduit 53 which engages an aperture in the cover-plate 15. In order that the ratio of gas and air mixture may be controlled the pipe is provided with a suitable control cock 54. Alternatively means may be provided for varying the distance which the nozzle 18 projects into the mixing passage. An igniter 30 is arranged opposite the mouth of the combustion chamber 49 and means are provided for removing the igniting wire out of the stream of hot gas, by rotating the plug on which it is carried. With this arrangement also the flame is mostly confined to the combustion chamber from which the hot products of combustion flow into the main gas stream and heat it.

In the arrangement shown in Figure 3, the mixing passage 48 is provided with a nozzle 55 which extends into the combustion chamber 49.

In the construction shown in Figure 4, the end of the combustion chamber 49 within the casing 20 is formed with an inlet chamber 47 and a Venturi passage 55 into which the nozzle 18 of the compressed-air pipe 17 projects.

In the construction shown in Figure 5, the Venturi passage and inlet chamber are dispensed with and injector nozzle 18 projects directly into the combustion chamber. The combustion chamber is provided with a number of inlet holes 48 near that end thereof which is attached to the cover-plate 15. The injector nozzle is arranged near the inlet holes 48 through which the gas in the casing 10 is drawn into the combustion chamber.

We claim:

1. An apparatus for heating an inflammable gas stream comprising a gas conduit, a second conduit, which second conduit is arranged with at least one open end within the gas conduit, said end having igniting means adjacent thereto, the other end having an opening in communication with said gas conduit to conduct gas from the gas conduit to the second conduit, a third conduit having at least a part thereof outside said gas conduit and having an open end directed into said other end of the second conduit so as to form an injector and of smaller bore than that end whereby compressed air may be injected into the second conduit to produce the injector action.

2. An apparatus for heating an inflammable gas stream within a gas conduit, comprising an open-ended first conduit disposed wholly within the gas conduit, a second conduit arranged partly in and partly out of the gas conduit, the inner end of said second conduit being directed into an open end of the first conduit so as to form an injector, and having a bore of smaller size than that of the end into which it is directed whereby compressed air may be injected into the first conduit to produce the injector action, and igniting means mounted adjacent to the other end of the first said conduit.

3. An apparatus for heating an inflammable gas stream within a gas conduit, comprising a first conduit having an open end thereof arranged within the gas conduit and the other end being closed and outside the conduit, means for independently connecting the exterior end with the gas conduit, a second conduit arranged wholly outside the gas conduit, and having an end directed into said exterior end of the first said conduit and of smaller bore so as to form an injector whereby compressed air may be injected into the first conduit to produce the injector action, and igniting means mounted adjacent to the first said end of the first said conduit within the gas conduit.

4. An apparatus for heating an inflammable gas stream comprising a gas conduit, a second conduit, provided with a throat having a divergent bore on each side thereof arranged with at least one open end within the gas conduit, said end having ignition means adjacent thereto, the other end having an opening in communication with the gas conduit to conduct gas from said gas conduit to the second conduit on that side of the throat remote from said open end, a third conduit having at least a part thereof outside said gas conduit and having an open end directed into said throat and itself having a smaller bore so as to form an injector whereby compressed air may be injected into the second conduit to produce the injector action.

5. An apparatus for heating an inflammable gas stream within a gas conduit, comprising a first conduit disposed wholly within the gas conduit and having one end open and the other closed by a wall of the gas conduit, a throat adjacent to the closed end providing a space near the closed end, means for connecting said space with the gas conduit, a second conduit arranged to extend through the wall of the gas conduit into said space, and having a bore smaller than said throat into which it is directed so as to form an injector, and igniting means adjacent to the first said end of the first conduit.

6. An apparatus for heating an inflammable gas stream within a gas conduit, comprising a first conduit disposed wholly within the gas conduit, one end of which first conduit is open and the other is closed by a wall of the gas conduit, openings in the wall of the first conduit adjacent to the closed end, a second conduit arranged to extend through the wall of the gas conduit into the first said conduit and terminating close to the openings in the walls thereof, the bore of which second conduit is smaller than that of the first conduit so as to form an injector, and igniting means mounted adjacent to the first said end of said conduit.

7. An apparatus for heating an inflammable gas stream comprising a gas conduit, a second conduit arranged with the gas conduit so that at least one open end thereof is within the gas conduit, said end having ignition means adjacent thereto, the other end having an opening in communication with said gas conduit to conduct gas from the gas conduit to the second conduit, means for controlling the rate of flow of the conducted gas, a third conduit extending into said other end of the second conduit, the bore of which third conduit is smaller than that of the first conduit so as to form an injector whereby compressed air may be injected into the second conduit to produce an injector action.

LEONARD SILVER.
MICHAEL MACCORMAC.